(12) United States Patent
Nakazawa et al.

(10) Patent No.: US 7,588,098 B2
(45) Date of Patent: Sep. 15, 2009

(54) CONTROLLER FOR USE WITH AN ELECTRIC SCREWDRIVER

(75) Inventors: Hiroyuki Nakazawa, Tokyo (JP); Hideki Fujita, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 0 days.

(21) Appl. No.: 12/104,178

(22) Filed: Apr. 16, 2008

(65) Prior Publication Data

US 2008/0196914 A1 Aug. 21, 2008

Related U.S. Application Data

(60) Division of application No. 11/712,111, filed on Feb. 28, 2007, now Pat. No. 7,464,769, which is a continuation of application No. PCT/JP2005/014311, filed on Aug. 4, 2005.

(30) Foreign Application Priority Data

Aug. 30, 2004 (JP) ............................. 2004-250757

(51) Int. Cl.
*B25B 23/142* (2006.01)
(52) U.S. Cl. .................. 173/176; 173/179; 173/181; 173/217
(58) Field of Classification Search ............ 173/176, 173/179, 181, 217
See application file for complete search history.

(56) References Cited

U.S. PATENT DOCUMENTS

| 4,307,325 A | 12/1981 | Saar |
| 4,503,370 A | 3/1985 | Cuneo |
| 4,689,534 A | 8/1987 | Gerber et al. |

(Continued)

FOREIGN PATENT DOCUMENTS

EP 0 170 068 A2 2/1986

(Continued)

OTHER PUBLICATIONS

Office Action issued Jun. 10, 2008 in Japanese patent application No. 2004-250757 (with translation).

(Continued)

*Primary Examiner*—Brian D Nash
(74) *Attorney, Agent, or Firm*—Brinks Hofer Gilson & Lione

(57) ABSTRACT

An object of the present invention is to provide an electric screwdriver device having a function for determining that a correct tightening operation has been carried out when the tightening operation has taken a time longer than a reference time predetermined for the tightening operation, characterized in comprising a novel feature for determining the reference time. The electric screwdriver device of the present invention comprises a torque monitor (40, S4) for monitoring whether or not a load torque in carrying out the tightening by using the electric screwdriver 12 has reached the tightening completion torque, a timer (40, S1, S5) for measuring the time consumed from the starting of the tightening operation until the tightening torque has reached the tightening completion torque, as the tightening operation time, and a feature (40, S6-S10) for determining the reference time for a subsequent tightening operation based on a plurality of tightening operation time obtained from the timer in the tightening operations carried out for the predetermined number of screws.

3 Claims, 6 Drawing Sheets

U.S. PATENT DOCUMENTS

| | | | |
|---|---|---|---|
| 5,284,217 A | 2/1994 | Eshghy | |
| 5,315,501 A | 5/1994 | Whitehouse | |
| 5,361,852 A | 11/1994 | Inoue et al. | |
| 5,402,688 A | 4/1995 | Okada et al. | |
| 5,440,215 A | 8/1995 | Gilmore | |
| 5,563,482 A | 10/1996 | Shaw et al. | |
| 5,650,574 A | 7/1997 | Sato et al. | |
| 5,831,402 A | 11/1998 | Yang | |
| 5,837,907 A | 11/1998 | Ohmi et al. | |
| 5,898,598 A | 4/1999 | Szwast et al. | |
| 6,536,536 B1 | 3/2003 | Gass et al. | |
| 6,655,471 B2 | 12/2003 | Cripe et al. | |
| 6,971,454 B2 | 12/2005 | Bogue | |
| 2005/0045353 A1 | 3/2005 | Kawai et al. | |
| 2005/0263304 A1 | 12/2005 | Sainomoto et al. | |

FOREIGN PATENT DOCUMENTS

| | | |
|---|---|---|
| EP | 0 170 068 B1 | 9/1991 |
| JP | 58-71079 | 4/1983 |
| JP | 58-71079 A | 4/1983 |
| JP | 61-50777 A | 3/1986 |
| JP | 62-157784 A | 7/1987 |
| JP | 63-318270 | 12/1988 |
| JP | 63-318270 A | 12/1988 |
| JP | 4-176573 A | 6/1992 |
| JP | 7-60656 A | 3/1995 |
| JP | 09-029655 | 2/1997 |
| JP | 9-29655 A | 2/1997 |
| JP | 2000-47705 A | 2/2000 |
| JP | 2001-275374 A | 10/2001 |
| JP | 2003-123050 A | 4/2003 |

OTHER PUBLICATIONS

International Preliminary Report issued Feb. 28, 2007 in International application No. PCT/JP2005/014311.

English translation of Office Action issued Feb. 15, 2008 in Chinese patent application No. 200580034720.9.

Notification of First Office Action from the Korean Patent Office, dated Feb. 16, 2009 (27 pages).

CONTROLLER FOR USE WITH AN ELECTRIC SCREWDRIVER

This application is a divisional application of U.S. patent application Ser. No. 11/712,111 filed Feb. 28, 2007, now U.S. Pat. No. 7,464,769, which is a continuation of PCT/JP2005/014311, filed Aug. 4, 2005, which claims priority to Japanese Application No. JP2004-250757, filed Aug. 30, 2004. The entire contents of these applications are incorporated herein by reference.

BACKGROUND OF THE INVENTION

1. Field of the Invention

The present invention relates to an electric screwdriver and a controller thereof.

2. Description of the Related Art

There has been provided one type of electric screwdriver equipped with a controller having a function for preventing any screws from being left not tightened. The electric screwdriver, in this type, is connected to the controller, so that when a tightening torque has reached a value equal to or greater than a predetermined value in a tightening operation, a signal indicating the completion of screw-tightening is sent from the electric screwdriver to the controller, and then the controller causes a specific counter (a counter for counting a number of screws tightened) to increment by one to provide a count indication of the number of tightened screws or inform a situation that the number of tightened screws has reached a predetermined one (see, for example, Japanese Patent Application Publication No. 2000-47705, Japanese Patent Application Publication No. Hei7-80128 and Japanese Patent Application Publication No. 2003-123050.

In the tightening operation using the electric screwdriver, however, there might be an event that a screw has been tightened out of upright. If a screw is tightened out of upright, typically the tightening torque could reach the predetermined value in a shorter time than in a tightening operation normally carried out. Also, when the screw that has been once tightened is tightened again (for additional tightening), the tightening torque could reach the predetermined value in a shorter time than in a tightening operation normally carried out. Due to this fact, a typical (in most cases, minimal) tightening time expected in the normal tightening operation is previously set as a reference time in the controller, such that if the signal indicating the completion of the tightening is generated by the electric screwdriver in a shorter time than the reference time, then the controller can determine that the screw must have been tightened in the inclined state or a once tightened screw has been tightened again (for additional tightening).

To determine the aforementioned reference time, it is conventional that a test of tightening is carried out on a certain number of screws prior to a practical tightening operation, in which a time consumed for properly operating screw-tightening is measured by using, for example, a stopwatch, and specifically a shortest time in the time measurements is taken as the reference time. Such a tightening test is, however, a highly cumbersome work for a user.

There is another possible event in the practical operation, a screw might be tightened at an incorrect location, and in that case, an operation (manipulation) for inversely turning the electric screwdriver is carried out to untighten the screw. In such a case, in response to the operation for inversely turning the electric screwdriver, a counter for counting a number of tightened screws is needed to be reset so as to cancel the count in the incorrect tightening operation. Regarding this point, a device according to the prior art has following problems.

FIG. 9 shows a typical wiring diagram in an electric screwdriver D comprising a controller P with a function for preventing any screws from being left not tightened. In the drawing, "D1" and "D2" designate power source lines to a screwdriver motor M, "D3" is an start/stop signal line, "D4" is a tightening completion signal line and "D5" is a common line. The common line is connected to a reference voltage Vs. The power source lines D1 and D2 are connected to a power supply circuit S of the controller P. The screwdriver motor M is a type of direct-current motor and the power circuit S comprises a direct-current power source. "RS" designates a normal/reverse rotation select switch for changing the polarity of the power source output voltage in order to select the rotation direction of the motor M (normal or reverse rotation). "SS" designates a starting switch, which in response to an open/close operation by an operator, sends a start/stop signal to the power circuit S via the start/stop signal line D3. For example, when the starting switch SS is closed, the reference voltage Vs from the common line D5 is applied to the power circuit S as the start signal, whereas when the starting switch is opened, the reference voltage Vs from the common line D5 is shut off, and the stop signal is sent to the power supply circuit by the shut-off. "BS" designates a braking switch of a normally open type, which is shifted to a closed position by an action of a cam C incorporated in the screwdriver when the load torque in the tightening operation has reached a predetermined value. When the braking switch BS is closed, a tightening completion signal at the reference voltage Vs is sent to a counter T for counting the number of tightened screws and also to the power supply circuit S in the controller P via the tightening completion signal line D4.

The circuit shown in FIG. 9 is not able to provide the signal from the electric driver D to the controller P to reverse the count in the counter T in a micro computer A for counting the number of the tightened screws when the user drives the electric screwdriver D in reverse direction to untighten the screw that has been tightened incorrectly as discussed above. To address this, it may be contemplated that the circuit configuration of the electric screwdriver D is modified as such as shown in FIG. 10. Specifically, the normal/reverse rotation selection switch RS is moved from the motor power source lines D1 and D2 to signal line D5 and replaced by an ON/OFF switch, wherein the power source circuit in the controller P may be provided with normal/reverse changing function. In this modification, to cause the electric screwdriver D to rotate in reverse direction, the normal/reverse rotation selection switch RS may be turned to ON position (closed state), for example, so as to send a signal (ON signal) of the reference voltage Vs from the common line D6 to the power supply circuit S in the controller P through the signal line D5 as a reverse rotation control signal, and to cause the power supply circuit S to invert the polarity of the output voltage (motor driving voltage), while at the same time sending the same ON signal to the counter T to reverse the count back.

However, such a configuration would lead to some disadvantages, including a problem of cost increase in association with the increased number of signal lines in the electric screwdriver and another problem of no compatibility that an existing electric screwdriver is no more applicable to the controller having been modified as such as described above.

SUMMARY OF THE INVENTION

The present invention is directed to solve the above-problems. Specifically, the present invention provides an electric screwdriver controller having a function for determining that a correct tightening operation has been carried out when said tightening operation has taken a time longer than a reference time. The controller comprises:

a torque monitoring means for monitoring whether or not a load torque in carrying out a tightening operation by using an electric screwdriver has reached a tightening completion torque indicating the completion of the tightening operation;

a timer means for measuring a time interval from a starting time of the tightening operation to a time when the tightening torque has reached the tightening completion torque, as a tightening operation time; and a means for determining a reference time for a subsequent tightening operation based on a plurality of tightening operation time obtained from said timer means in the tightening operations carried out for a predetermined number of screws.

This electric screwdriver controller may specifically comprise:

an expected time setting means for setting an expected time from the starting time to the completion time of the tightening operation;

a comparing means for comparing the tightening operation time obtained from said timer means to said expected time for each of the tightening operations; and an expected time renewing means operable, when a comparison result indicating that the tightening operation time is not longer than the expected time is given by said comparing means, to renew said expected time by replacing said expected time with said tightening operation time, wherein the expected time obtained from the expected time renewing means at the time of completion of the tightening operations for a predetermined number of screws is taken as the reference time.

More specifically, an electric screwdriver controller according to the present invention may comprise:

a time block setting means for setting a predetermined time period as a time block;

a tightening completion torque setting means for setting a tightening completion torque; and a clock initialization means for initializing said timer means.

Said timer means comprises:

a time block processing means for starting a time block processing in response to a starting of driving operation of said electric screwdriver; and a time block addition means for performing a time block processing again by adding by one time block at each time when the period for one time block has elapsed as long as said torque monitoring means determines that said tightening torque has not yet been reached said tightening completion torque.

Further, the present invention provides an electric screwdriver device comprising an electric screwdriver and a controller connected to said electric screwdriver.

Said controller comprises:

a power source and a power circuit for said power source, said power circuit having a function for performing a switching operation of the polarity of a power source terminal of said power source between a state for a normal rotation and a state for a reverse rotation in accordance with a normal rotation signal or a reverse rotation signal generated by said electric screwdriver and for shutting down an output from said power source in accordance with a stop signal of said electric screwdriver or a tightening completion signal generated by said electric screwdriver; and a tightening completion signal and reverse rotation signal processing means for processing said tightening completion signal and said reverse rotation signal.

Said power source may be a direct current power source.

Said electric screwdriver comprises:

a screwdriver motor having a power source connecting +/−line to be connected to the power source terminal of said power circuit;

a common line for supplying a reference voltage;

a pair of power source lines for connecting said power circuit of said controller to said screwdriver motor;

a normal rotation/reverse-rotation shifting switch for shifting between the normal rotation and the reverse rotation of the screwdriver motor;

a first signal line for interconnecting a first output terminal of said normal rotation/reverse-rotation shifting switch and said controller;

a second signal line for interconnecting a second output terminal of said normal rotation/reverse-rotation shifting switch and said controller;

a starting switch connected between said common line and a first input terminal of said normal rotation/reverse-rotation shifting switch; and a braking switch connected in parallel with said starting switch between said common line and a second input terminal of said normal rotation/reverse-rotation shifting switch.

Said normal rotation/reverse-rotation shifting switch is capable of switching between a normal rotation connecting position where it is operable to connect said starting switch to said first signal line and to connect said braking switch to said second signal line, and a reverse rotation connecting position where it is operable to connect said starting switch to said second signal line and to connect said braking switch to said first signal line.

Said starting switch is adapted:

to supply a start signal and a stop signal from said first signal line to said controller, respectively, by turning ON and OFF during said normal rotation/reverse-rotation switch being positioned in said normal rotation connecting position; and to supply the start signal and the stop signal from said second signal line to said controller, respectively, by turning ON and OFF during said normal rotation/reverse-rotation switch being positioned in said reverse-rotation connecting position.

Said braking switch is adapted:

in case of it being a normal-open type switch, to be closed when the tightening completion torque for the tightening operation having been reached and to supply a tightening completion signal to said controller; and in case of it being a normal-close type switch, to be opened when the tightening completion torque for the tightening operation having been reached and to supply a tightening completion signal to said controller.

This electric screwdriver device may be configured specifically such that said tightening completion signal and reverse rotation signal processing means comprises a tightening operation counter adapted to start counting upon receipt of the tightening completion signal and to reverse the counting upon receipt of the reverse rotation signal.

Further, the present invention provides an electric screwdriver device comprising an electric screwdriver and a controller connected to said electric screwdriver. Said controller has a power circuit comprising a power source. Said electric screwdriver has a screwdriver motor having a power source connecting +/− line to be connected to a power source terminal of said power circuit. Said power source may be a direct-current power source. said screwdriver motor may be a direct-current motor of brush type.

said power circuit has a power circuit control section which comprises:
a means for shutting down said power circuit to said motor in response to a receipt of the tightening completion signal or the stop signal of said electric screwdriver generated by said electric screwdriver;
a means for forming a braking short circuit including said motor in response to a receipt of the tightening completion signal or the stop signal of said electric screwdriver generated by said electric screwdriver; and
a control means for providing an ON/OFF control of said braking short circuit.
Said control means is adapted to repeat the ON and the OFF states alternately in a manner that periods of the OFF states are kept constant and periods of the ON states are made longer gradually with the number of revolutions of said motor is reduced.

This electric screwdriver device may be configured specifically such that said screwdriver motor may be a direct-current motor of brush type, and said power circuit has a power circuit control section.

Said power circuit control section comprising:
a means for shutting down said power circuit to said motor in response to a receipt of the tightening completion signal or the stop signal;
a means for forming a braking short circuit including said motor in response to a receipt of the tightening completion signal or the stop signal; and
a control means for providing an ON/OFF control of said short braking circuit. Said motor may be a direct-current motor.
Said control means is adapted to repeat the ON and the OFF states alternately in a manner that periods of the OFF states are kept constant and periods of the ON states are made longer gradually with the number of revolutions of said motor is reduced.

Since the present invention has made it possible to generate the signal for reversing a counting by the counter for counting the number of tightened screws in the controller without increasing the number of signal lines as compared to the conventional electric screwdriver, said signal being required when a screw has not been correctly screwed-down and that screw has been rotated reversely and removed, therefore any complication and cost increase, which otherwise would be caused by increased number of lines, could be avoided.

Further, the present invention allows for the expected time of tightening (reference time) to be taken as a reference for determining whether or not the tightening operation has been successfully completed to be determined automatically by simply conducting a tightening test for a certain number of screws rather than by using a stopwatch as practiced conventionally, and thus determined expected time can be set in the controller.

Furthermore, since in the present invention, in applying the ON/OFF control to the braking short circuit to be formed at the time of the completion of the tightening operation, the OFF time is kept for a certain period but the ON time is varied in dependence on the number of revolutions of the motor or the magnitude of the current flowing through the braking short circuit, therefore the braking short circuit can be operated efficiently so as to provide an efficient braking in a short time. In the conventional device, since the ON/OFF control has been carried out by PWM (pulse width modulation), where the motor is in a high-speed revolution and an excessively high current is flowing, therefore the ON is short and consequently the OFF is made longer, resultantly inhibiting the efficient braking, which circumstance is to be improved by the present invention.

DESCRIPTION OF THE PREFERRED EMBODIMENTS

Preferred embodiments of an electric screwdriver device according to the present invention will now be described with reference to the attached drawings.

Figure 1:
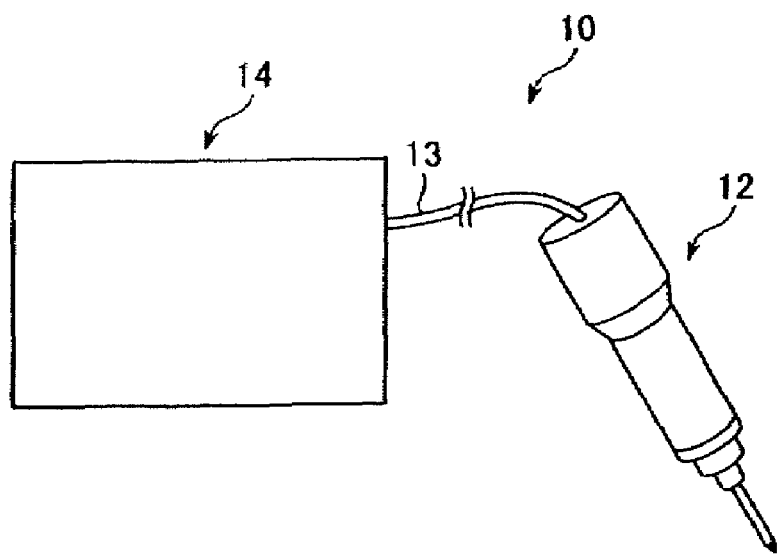
FIG. 1 is a schematic view of an electric screwdriver device according to the present invention.

As shown in FIG. 1, an electric screwdriver device 10 according to the present invention comprises an electric screwdriver 12 and a screwdriver controller 14 connected to the electric screwdriver via a cable 13 and having a function for preventing any screws from being left not tightened.

Figure 2:
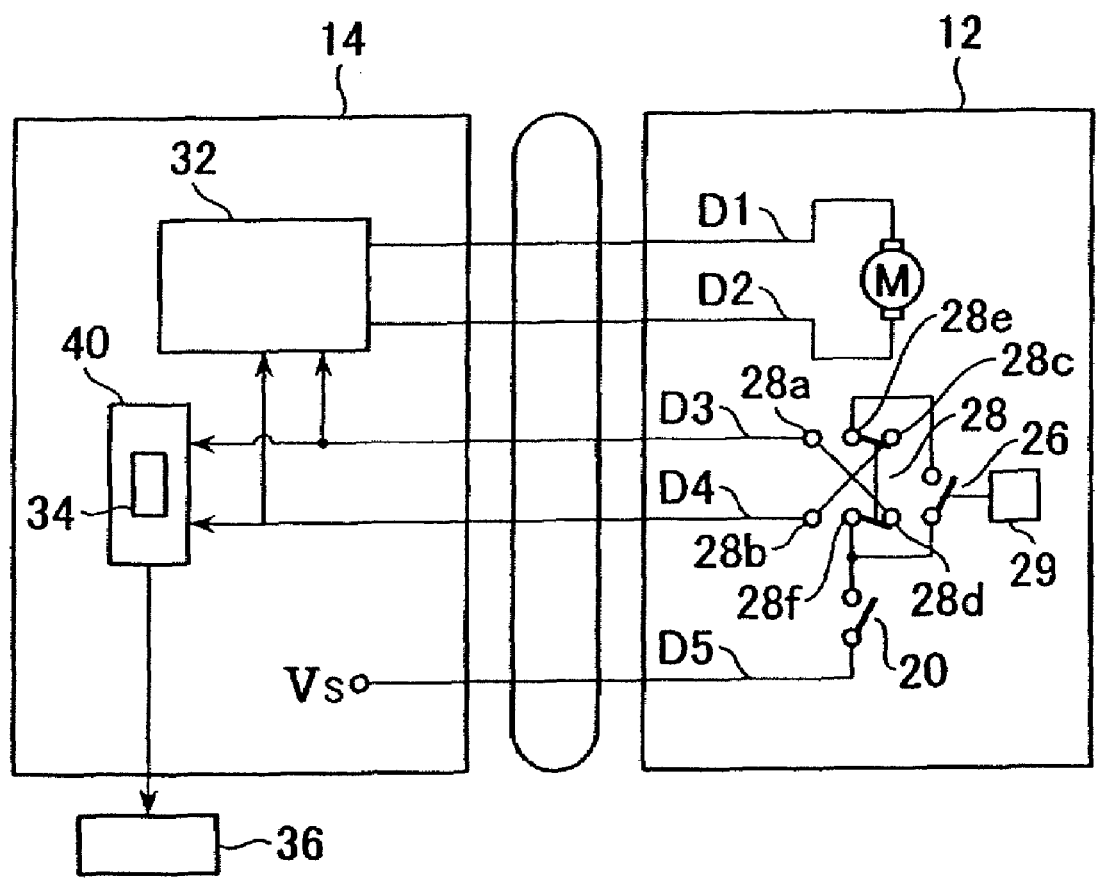
FIG. 2 is an electric diagram of the same device.

The electric screwdriver 12 has an electric circuit (electric screwdriver circuit) as shown in FIG. 2 in association with the function for preventing any screws from being left not tightened. The illustrated electric screwdriver circuit is intended to solve the problems in conjunction with the prior art as set forth above with reference to FIGS. 9 and 10. The circuit comprises power source lines D1 and D2 for supplying a drive voltage to a screwdriver motor M, a first and a second signal lines D3 and D4 for sending an appropriate signal from the electric screwdriver 12 to the controller 14, and a common line D5 for generating an appropriate signal onto the first and the second signal lines D3 and D4. The common line D5 is connected to a reference voltage Vs.

Further, this electric screwdriver circuit has a normal rotation/reverse-rotation shifting switch 28. The normal rotation/reverse-rotation shifting switch 28 has fixed contacts 28a, 28b, 28c and 28d and movable contacts 28e and 28f. The fixed contact 28a is connected to the fixed contact 28d and the fixed contact 28b is connected to the fixed contact 28c. One of the movable contacts 28f is connectable to the common line D5 via a starting switch 20, and the other of the movable contacts 28e is connectable to the common line D5 via a braking switch 26 and the starting switch 20. The normal rotation/reverse-rotation shifting switch 28 is adapted to be manually shifted by an operator between a normal rotation connecting position (FIG. 2) where the movable contacts 28e and 28f are in contact with the fixed contacts 28c and 28b, respectively and a reverse rotation connecting position (not shown) where the movable contacts 28e, 28f are in contact with the fixed contacts 28a and 28b, respectively.

The starting switch 20 is an ON/OFF switch intended to send a start/stop signal in response to the manual operation by the operator to the controller 14. If the starting switch 20 is closed (ON) under the condition where the normal rotation/reverse-rotation shifting switch 28 is in the normal rotation connecting position as illustrated, the signal (ON signal) at the reference voltage Vs from the common line D5 is sent from the starting switch 20 to the first signal line D3 via the movable contact 28f and the fixed contacts 28d and 28a of the normal rotation/reverse-rotation shifting switch 28, and through the first signal line D3, the signal is passed to a power circuit 32 of the controller 14 as the start signal. A microcomputer 40 in the controller 14 is shifted to the normal rotation mode in response to a receipt of the start signal through the first signal line D3. If the starting switch 20 is shifted to an open state (OFF), the signal at the reference voltage Vs from the common line D5 is shut off, and this is given as the stop signal to the power circuit 32 of the controller 14.

On the other hand, if the starting switch is turned into the closed state (ON) under the condition where the normal rotation/reverse-rotation shifting switch 28 is in the reverse rotation connecting position, the signal (ON signal) at the reference voltage Vs from the common line D5 is sent from the starting switch 20 to the second signal line D4 via the movable contact 28f and the fixed contact 28b of the normal rotation/reverse-rotation shifting switch 28, and through the second signal line D4, the signal is passed to the power circuit 32 of the controller 14 as the start signal (i.e., the reverse rotation signal). Further, the microcomputer 40 of the controller 14 is shifted to the reverse rotation mode in response to the receipt of the same ON signal through the second signal line D4, and a counter for counting the number of tightened screws in the microcomputer 40 now in this mode carries out the reverse counting by decreasing the count value by one. Furthermore, in the reverse rotation mode, as is the case with the normal rotation mode, if the starting switch 20 is shifted to the open state (OFF), the ON signal at the reference voltage Vs from the common line D5 is shut off thereby providing the stop signal to the power circuit 32 of the controller 14.

The braking switch 26 is a normal-open type switch and adapted to be shifted to the closed state by a cam 29 incorporated in the screwdriver 12, which is activated when the load torque in the tightening operation has reached a predetermined value. When the braking switch 26 is closed, the tightening completion signal is sent from the screwdriver 12 to the controller 14. More specifically, when the braking switch 26 is closed while the normal rotation/reverse-rotation shifting switch 28 is in the normal rotation connecting position as illustrated, the signal at the reference voltage Vs from the common line D5 is sent from the braking switch 26 to the second signal line D4 via the movable contact 28e and the fixed contacts 28c and 28b of the normal rotation/reverse-rotation shifting switch 28 as the tightening completion signal and through the second signal line D4, the signal is sent to the screwdriver controller 14. In the screwdriver controller 14, the power circuit 32 is activated in response to the tightening completion signal from the second signal line D4 to shut down the output of the motor driving voltage and to make a short circuit of the power source lines D1 and D2 to apply the braking action to the screwdriver motor M. In conjunction with this, the counter 34 for counting the number of tightened screws in the microcomputer 40 is caused to increase the count value by one.

It is to be noted that although FIG. 2 shows the configuration in which the start signal, the stop signal and the tightening completion signal are to be supplied directly from the respective signal lines to the power circuit 32 within the screwdriver controller 14, another configuration may be contemplated, in which the microcomputer 40 once receives all of the signals from the electric screwdriver 12 so as to control the power circuit 32.

In the tightening operation, when the normal rotation/reverse-rotation shifting switch 28 is placed in the normal rotation connecting position as illustrated and the starting switch 20 is turned ON, then start signal (reference voltage Vs) is sent to the power circuit 32 within the controller 14 via the first signal line D3, and the motor driving voltage having the polarity for the normal rotation is sent from the power circuit 32 to the motor M via the power source lines D1 and D2.

When the motor M is driven in the direction for normal rotation to carry out the tightening operation and subsequently the load torque has reached a predetermined value (i.e., when the tightening operation has been completed), the braking switch 26 is closed by the cam 29 (which is activated by the rotationally driven shaft of the electric screwdriver), and the tightening completion signal is sent to the power circuit 32 and the microcomputer 40 (and thus to the counter 34 for counting the number of tightened screws) within the screwdriver control device 14. In the power circuit 32, any required actions, such as stopping or shutting off of the output of the motor driving voltage, is carried out, while in the counter 34, the counting is carried out under the assumption that one of the screws has been tightened. The counting result (i.e., the count value or the accumulated number of screws that have been tightened) is indicated in a display 36.

If a wrong screw has been tightened, the operator may shift the normal rotation/reverse-rotation shifting switch 28 to the reverse-rotation connecting position so as to close the starting switch 20 and thus to cause the starting signal (i.e., the reverse rotation signal) to be sent via the second signal line D4 and thereby cause the power circuit 32 of the controller 14 to invert the output polarity, which in turn drives the motor M in the direction for reverse rotation to turn the screw, that has been once tightened, in the loosening direction for removing the screw. At the same time, the reverse rotation signal is sent to the counter 34, where the count is reversed to modify the counting of the number of tightened screws.

As set forth above, in the circuit wiring of the electric screwdriver shown in FIG. 2, the present invention allows the counter for counting the number of tightened screws in the controller to have a function for reversing the count in association with the reverse rotation of the electric screwdriver without increasing a number of signal lines from the electric screwdriver to the controllers.

Figure 9:
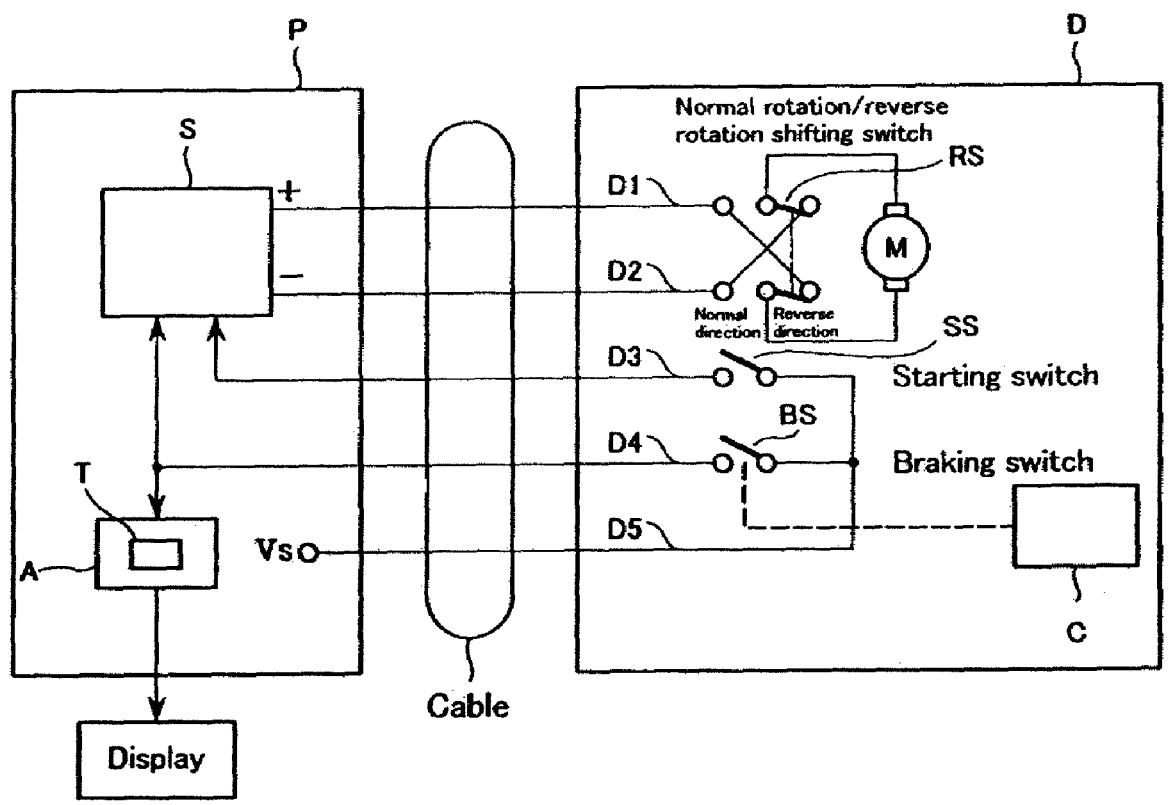
FIG. 9 is a circuit diagram of an electric screwdriver device according to the prior art.
Figure 10:
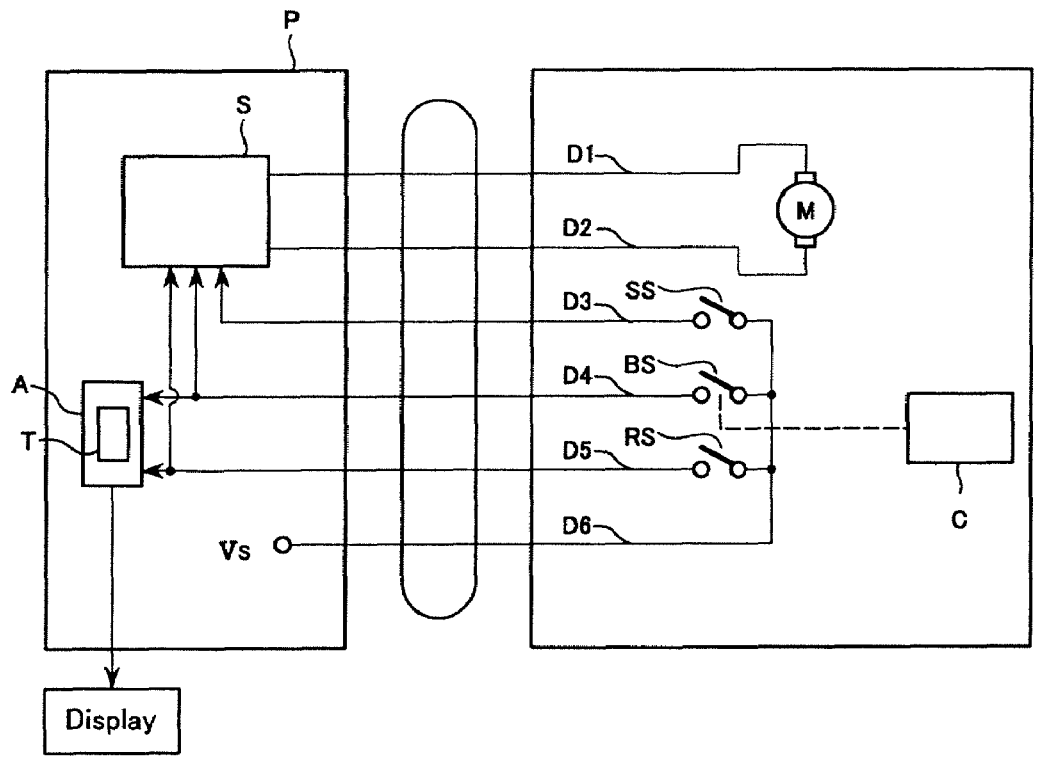
FIG. 10 shows a circuit diagram contemplated in a case where the electric screwdriver device of FIG. 9 is to be provided with a function for performing a reverse counting by a counter for counting the number of tightened screws when the screwdriver motor being rotated reversely.
Figure 11:
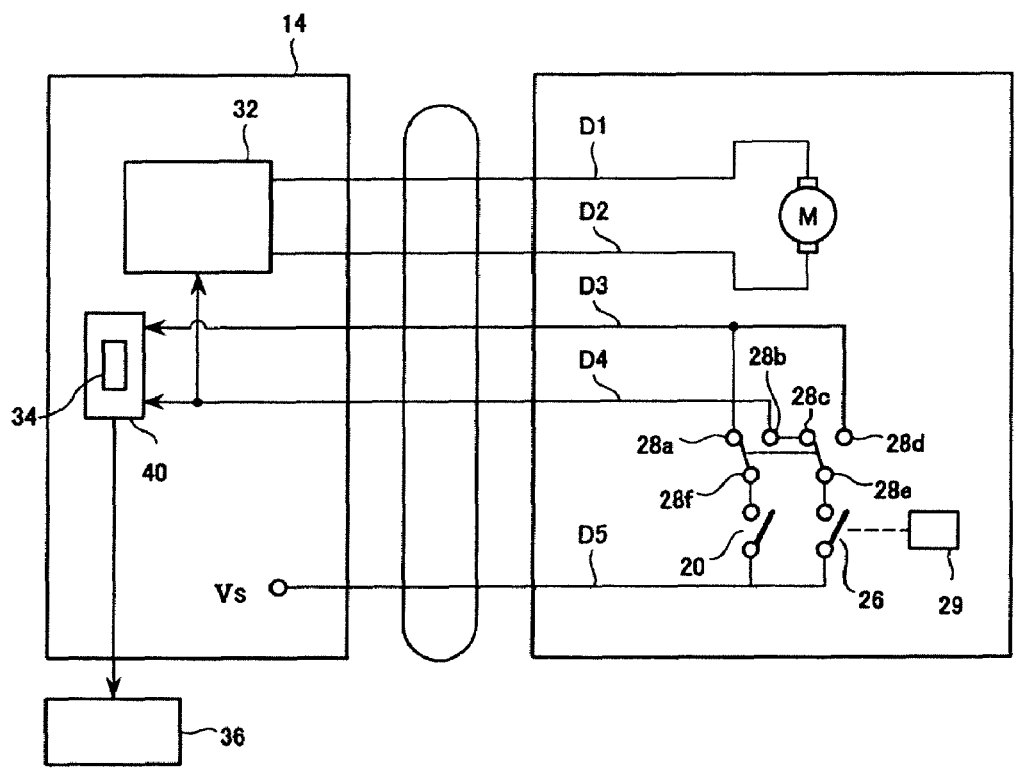
FIG. 11 is a circuit diagram that has been initially developed by the inventors of the present invention in order to improve the electric circuit of FIG. 10.

It is to be noted that the circuit wiring of the electric screwdriver illustrated in FIG. 2 has been developed in order to solve problems (which will be discussed below) found in the circuit wiring as shown in FIG. 11, which had been initially developed by the inventor of the present invention to solve the problems as pointed out with reference to FIGS. 9 and 10.

Specifically, in the circuit wiring of FIG. 11, the electric screwdriver has power source lines D1 and D2 for the screwdriver motor M, the first and the second signal lines D3 and D4, and the common line D5, like the one as shown in FIG. 2. The common line D5 is fixed at the reference voltage Vs (e.g., 0 volt). Further, this electric wiring has the normal rotation/reverse-rotation shifting switch 28. The normal rotation/reverse-rotation shifting switch 28 includes the fixed contacts 28a, 28b, 28c and 28d, and the movable contacts 28e and 28f. The fixed contact 28b is connected to the fixed contact 28c. The movable contact 28f is connected to the common line D5 via the starting switch 20, while the movable contact 28e is connected to the common line D5 via the braking switch 26. The normal rotation/reverse-rotation shifting switch 28 is adapted to be shift between the normal rotation connecting position (FIG. 11) where the movable contacts 28e and 28f are connected to the fixed contacts 28a and 28c respectively and the reverse rotation connecting position (not shown) where the movable contacts 28e and 28f are connected to the fixed contacts 28b and 28d respectively. Respective actions in the controller 14 including the activation, the reverse rotation, the normal counting and reverse counting of the number of tightened screws and so on based on the operations of the starting switch 20, the braking switch 26 and the normal rotation/reverse-rotation shifting switch 28 are carried out in a similar manner to that in the circuit shown in FIG. 2.

The problems in this circuit wiring are those as described below. The cam 29 has a raised portion which turns the braking switch 26 on when any excessive loading occurs. After setting the normal rotation or reverse-rotation by the normal rotation/reverse-rotation shifting switch, the starting switch is turned ON to carry out the tightening operation. In the tightening operation, when the braking switch is turned on, occasionally the braking switch could be held in the ON position by the raised portion of the cam. If the normal rotation or reverse rotation is set by the rotation/reverse-rotation switch under the condition where the braking switch is held in the ON position, the CPU in the microcomputer of the controller 14 determines that in a subsequent program cycle, the normal rotation or reverse rotation has been set by the rotation/reverse-rotation switch and the starting switch has been turned on, thereby activating the screwdriver in spite of the fact that the starting switch is actually not turned on. In contrast to this, in the circuit wiring of FIG. 2, even if the braking switch is in such a condition as described above, the starting switch arranged in series with the braking switch is held in the OFF position, and thus no problem will occur.

Another feature of the electric screwdriver device according to the present invention will now be described. In the controller 14 of the electric screwdriver device according to the present invention, a reference value is determined in order to enable the determination whether or not the screw has been tightened correctly without being inclined.

Specifically, in the electric screwdriver device according to the present invention, a tightening operation time is used as a reference to make the determination whether or not the tightening operation has been carried out correctly without causing the screw to be inclined or out of upright. This takes advantage of the fact that if the screw has been tightened out of upright, the tightening torque is increased more rapidly than that in the normal tightening operation to generate the tightening completion signal earlier. In the present invention, in order to determine the reference value for the tightening operation time, the tightening operation test is carried out for the predetermined number of screws prior to the actual tightening operation without requesting the operator to conduct a cumbersome process, wherein the time consumed for each correct tightening operation is measured and the minimal value is taken as the reference value for the tightening operation time. The microcomputer 40 in the controller 14 determines the reference value of the tightening operation time based on the tightening completion signal and the like from the electric screwdriver in this tightening operation test in a manner as will be described below.

Figure 3:
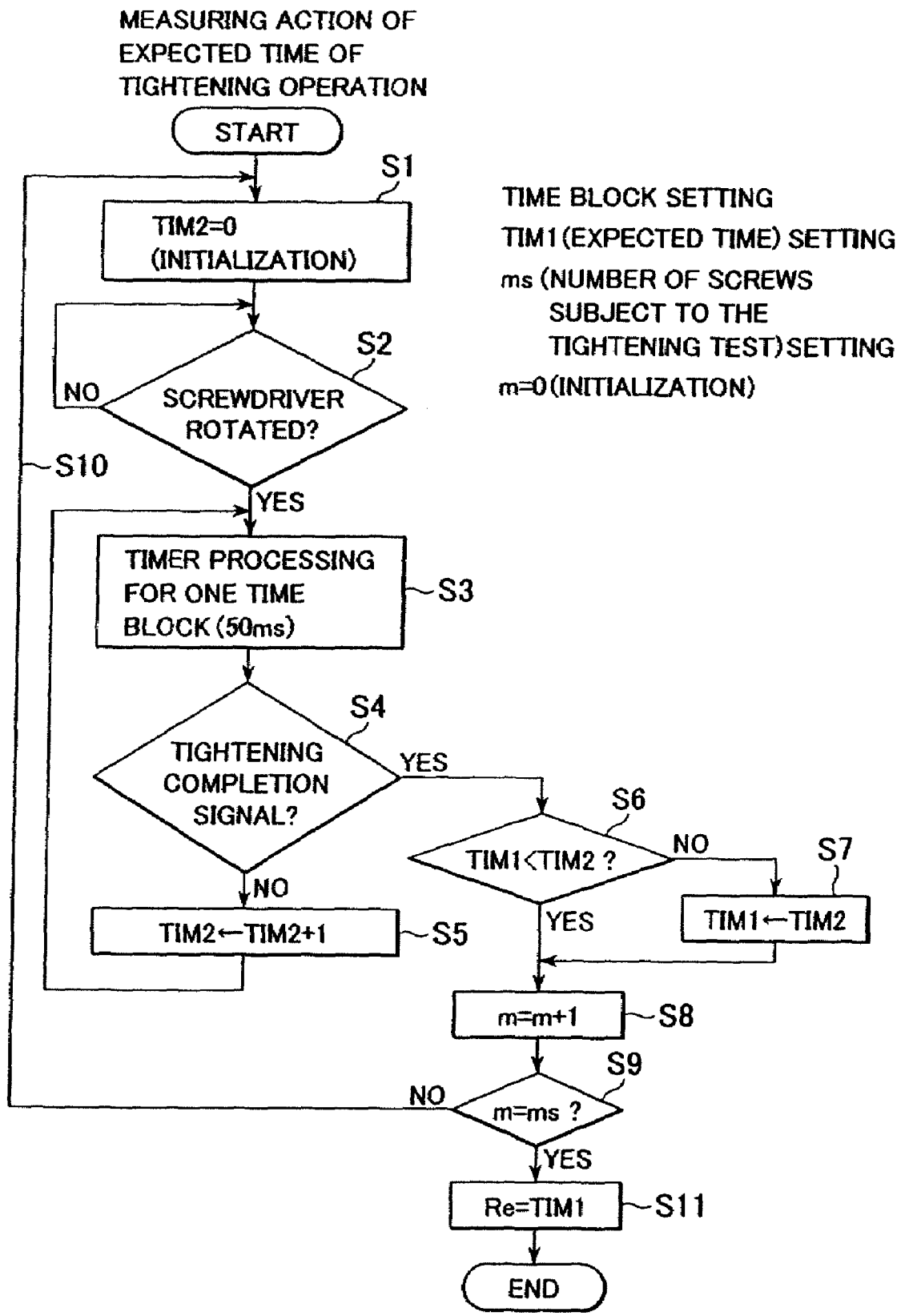
FIG. 3 is a flow chart illustrating a procedure for determining an expected time (reference time) for the completion of the tightening operation to be carried out in the same device.

FIG. 3 is a flow chart illustrating a procedure by the microcomputer 40 to determine the reference value for the tightening operation time according to the present invention.

Figure 4:
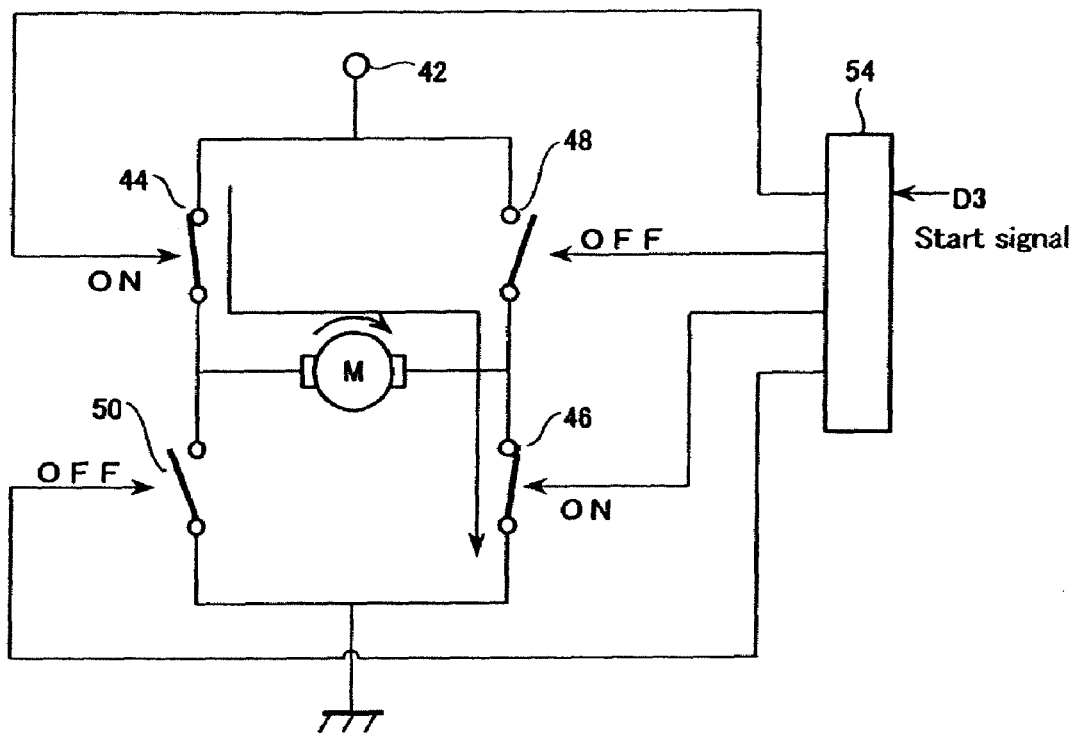
FIG. 4 is a circuit diagram in a normal rotation mode of a screwdriver motor in the same device.

In the illustrated embodiment, parameters are previously set such as a time block of a certain duration (50 msec in the illustrated embodiment), an expected time "TIM1" to be consumed until the tightening operation having been completed, a number of screws "ms" on which the tightening test is to be conducted and a number of screws on which the tightening test has been already finished (0 in the illustrated embodiment). When the tightening test is started, firstly a value of a tightening measuring time "TIM2" is initialized to zero (step S1). When the starting switch 20 is turned on in the tightening operation of each screw, the starting signal sent over the first signal line D3 is received, and it is determined that the motor M of the electric screwdriver has started the revolution (step S2). From this time in the flow of procedure, a timer processing or time measuring operation for each arbitrarily preset time block (50 msec in the illustrated embodiment) is started (step S3), and this timer processing is carried out repeatedly for every time block until the tightening completion signal is received from the second signal line D4 or until the load torque has reached the predetermined value for the tightening completion (step S4), wherein at each timer processing, the tightening operation time TIM2 is incremented by one time block (50 msec in the illustrated embodiment) (step S5). When it is determined by receiving the tightening completion signal that the tightening completion torque has been reached (step S4), the process further determines whether or not the tightening operation time TIM2 is larger than the previously set expected time TIM1 (step S6), wherein if the tightening operation time TIM2 is smaller than the expected time TIM1, the expected time TIM1 is replaced by the tightening operation time TIM2 which is treated as a new expected time TIM1, or the TIM1 is renewed (step S7). Further, the number of tested screws "m" is incremented by one (step S8). This process is carried out until the number of tested screw has reached the predetermined number of screws "ms" (step S9, S10), and the finally obtained TIM1 is set and stored as the reference value Re (step S11). This reference value Re is taken as the reference time to be used in determining whether or not the tightening operation has been successfully performed in the actual tightening operation to be conducted subsequently to the tightening test. It is to be noted that since if the expected time TIM1 is set shorter, then the reference time is set to be equal to the expected time TIM1, the expected time TIM1 may be automatically set to a maximum value of time that can be set by the expected time setting means or a time longer than a longest tightening operation time which may be taken in the tightening operation by the electric screwdriver. The description will now be directed to a third feature of the present invention. FIG. 4 is a conceptual diagram of an H-shaped bridge circuit for driving the motor M of the electric screwdriver 12 provided in the power circuit 32.

Specifically, M in FIG. 4 represents a DC motor of brush type serving as the screwdriver motor, 42 designates a positive power source voltage terminal for the direct-current power source, 44 is a first switch element, 46 is a second switch element, 48 is a third switch element, 50 is a fourth switch element and 54 is a power circuit controller section. The first switch element 44 is connected between the positive power source voltage terminal 42 and one of the terminals of the DC motor M, and the third switch element 48 is connected between the positive power source voltage terminal 42 and the other of the terminals of the DC motor M. Further, the fourth switch element 50 is connected between the ground terminal (negative power source voltage terminal) and the one of the terminals of the DC motor M, and the second switch element 46 is connected between the ground terminal and the other of the terminals of the DC motor M. Each switch elements 44, 46, 48, 50 is made of, for example, transistor and applied with the ON/OFF control by the power circuit control section 54.

The power circuit control section 54, upon receipt of the start signal for the normal rotation mode from the first signal line D3, controls the third switch element 48 and the fourth switch element 50 to be OFF and the first switch element 44 and the second switch element 46 to be ON so as to drive the motor M in the direction for normal rotation, as shown in FIG. 4.

Figure 5:
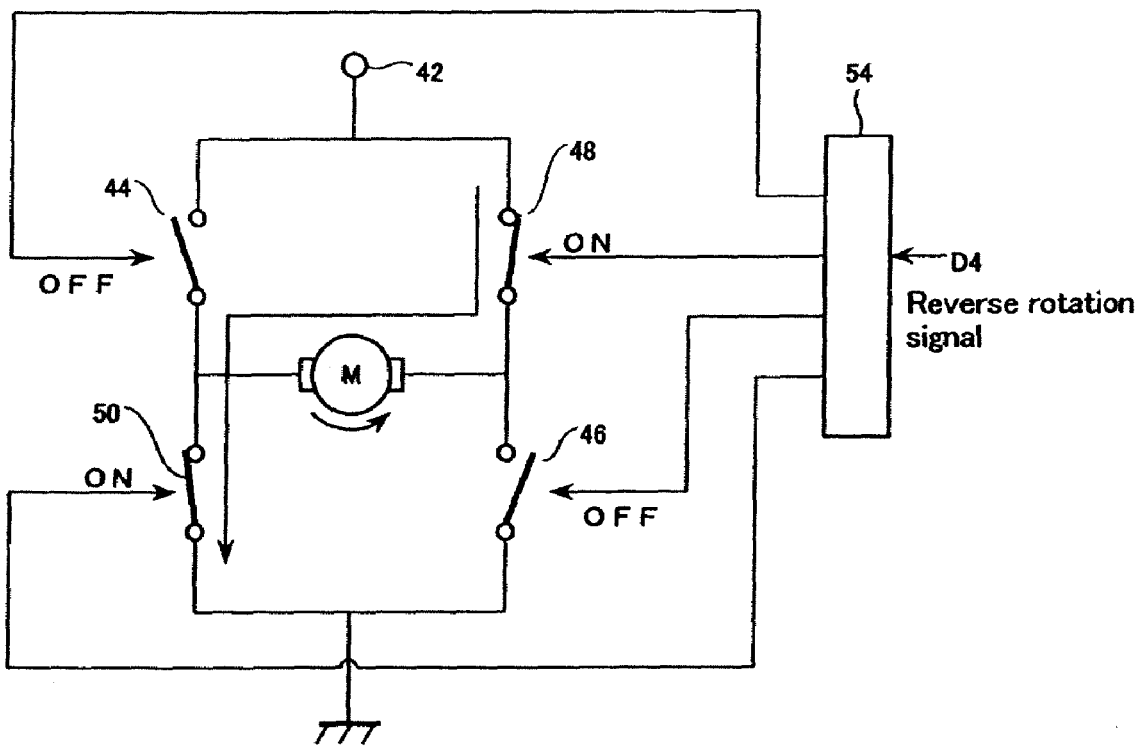
FIG. 5 is a circuit diagram in a reverse rotation mode of the same screwdriver motor.

In contrast, when the power circuit control section 54 receives the start signal for the reverse rotation mode (the reverse rotation signal) from the second signal line D4, it controls the first switch element 44 and the second switch element 46 to be OFF and the third switch element 48 and the fourth switch element 50 to be ON so as to drive the motor M in the direction for reverse rotation, as shown in FIG. 5.

Figure 6:
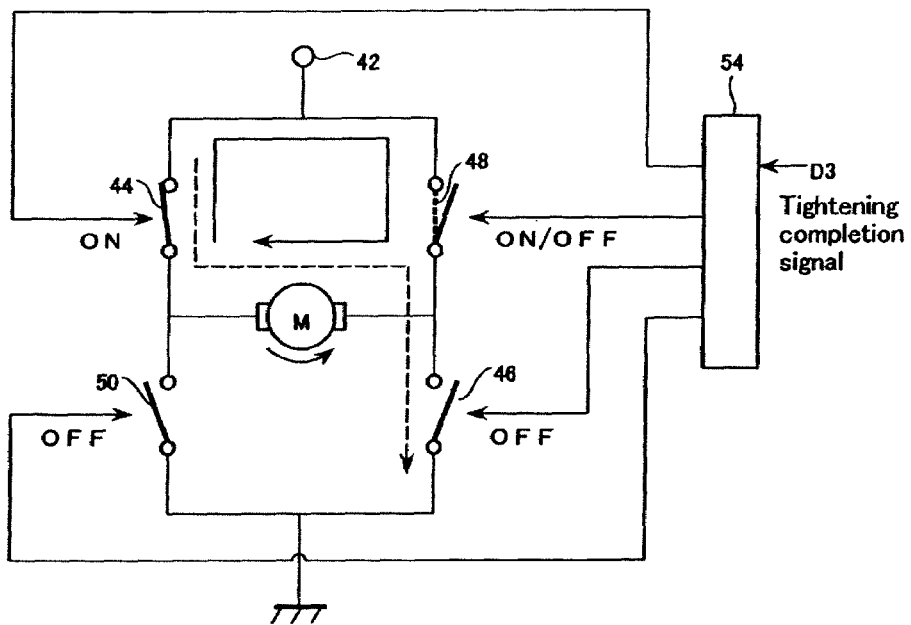
FIG. 6 is a circuit diagram in a tightening completion mode in the same screwdriver motor.

Further, the power circuit control section 54, upon receipt of the tightening completion signal from the second signal line D4 during its normal rotation, controls the second switch element 46 and the fourth switch element 50 to be OFF and the first switch element 44 and the third switch element 48 to be ON, as shown in FIG. 6. In this case, a closed circuit is formed which includes the first switch element 44, the third switch element 48 and the motor M, and the thus formed closed circuit works as the braking short circuit to the motor M to apply braking to the motor M.

If the motor M is in a high speed revolution at the time of formation of this braking short circuit, an electromotive force of high voltage is generated by the motor M and a high intensity of current flows through the same circuit. In the light of the fact that a wear of the brush is significant if the excessively high intensity of current flows through the DC motor of brush type, the present invention, in order to avoid the problem, provides ON/OFF control or switching control to the first switch element 44 and/or the third switch element 48 (the third switch element 48 in the embodiment of FIG. 6).

Figure 7:
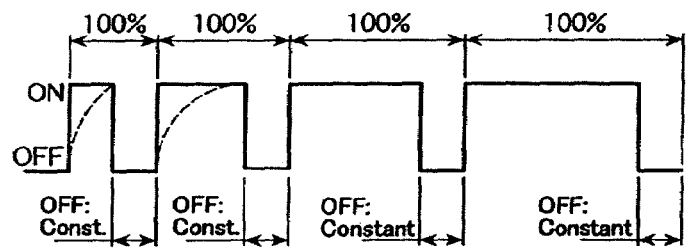
FIG. 7 shows an example of an ON/OFF signal used in an ON/OFF control to a braking short circuit to be formed in the tightening completion mode as shown in FIG. 6.
Figure 8A:
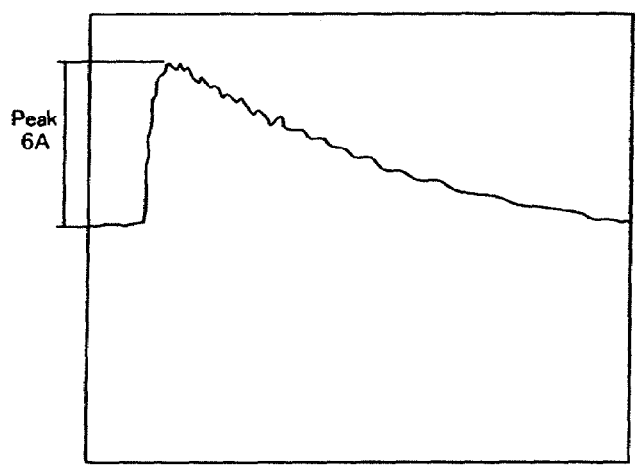
FIG. 8a plots a current value flowing through the braking short circuit for the case of no ON/OFF control provided to the short braking circuit.
Figure 8B:
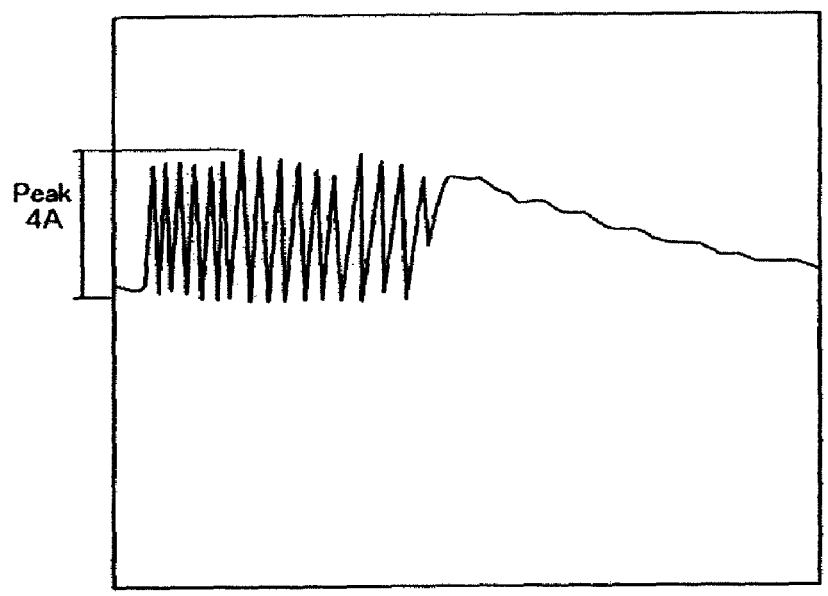
FIG. 8b plots the current value flowing through the braking short circuit for the case of ON/OFF control provided to the braking short circuit.

The present invention has employed a frequency modulated control method in order to provide this ON/OFF control, as shown in FIG. 7. In this method, during an initial stage where the motor M is in the high speed of revolution, the first switch element 44 and/or the third switch element 48 are/is controlled to make an ON/OFF action at high frequency (with a constant length of the OFF time period), which is gradually lowered to the ON/OFF action of frequency consistent with the revolution speed. Specifically, since when the motor M is in the high speed of revolution, the voltage generated by the motor M serving as the generator is high, the first switch element 44 and/or the third switch element 48 are/is controlled to make the ON/OFF action at high frequency. Since the OFF time period is kept constant, the time period for which the first switch element 44 and/or the third switch element 48 are/is kept ON is relatively made shorter, and consequently the increase in the current flowing through the circuit can be reduced. At the stage of the revolution speed of the motor M being lowered, the first switch element 44 and/or the third switch element 48 are/is turned ON/OFF at lower frequency. Although in this illustrated embodiment, the frequency is defined in four different levels as shown in FIG. 7, a stepless modulation may be also applicable. FIG. 8 shows a current flowing through the braking short circuit with no such ON/OFF control applied (FIG. 8*a*) and a current flowing through the braking short circuit with such ON/OFF control applied (FIG. 8*b*) according to the present invention. As seen from this, when the ON/OFF control is applied according to the present invention, the maximum current value flowing through the short circuit can be suppressed into the order of 4A by applying the short circuit current at a predetermined time interval.

Although the present invention has been described with respect to some exemplary embodiments, the present invention is not limited thereto. For example, although the controller 14 comprises the counter 34 for counting the number of tightened screws in the illustrated embodiment, the counter may be fitted externally, and in that case the controller is required only to send the tightening completion signal and/or the reverse rotation signal received from the electric screwdriver to the externally fitted counter. Further, although in the illustrated embodiment, the starting switch 20 is applied with the reference voltage, it may be applied with the ground potential.

The invention claimed is:

1. A controller for use with a screwdriver having a drive shaft and an electric motor activated to tighten a screw, the controller being configured to determine whether or not a correct tightening operation has been carried out, by comparing a time taken to complete the tightening operation and a reference time, the controller comprising:
   a torque monitor configured to monitor whether or not a load torque exerted by the screwdriver for the tightening operation has reached at a tightening completion torque;
   a timer configured to measure a tightening operation time which starts at a beginning of the tightening operation and ends when the tightening torque has reached at the tightening completion torque;
   a reference time setter configured to determine the reference time for use in subsequent tightening operations, based on a plurality of tightening operation times measured by the timer;
   an expected time setter configured to initially define an expected time to complete the tightening operation;
   a comparator configured to compare a tightening operation time against the expected time, every time the timer measures the tightening operation time taken to complete a respective tightening operation; and
   an expected time renewer configured to define the measured tightening operation time as a new expected time, each time the comparator determines that the measured tightening operation time is not longer than the expected time,
   wherein the reference time is defined with the expected time calculated from the tightening operation times taken to complete a plurality of the tightening operations performed.

2. A controller in accordance with claim 1, wherein the expected time is initially set with one of a maximum value of time countable by the expected time setter and a time longer than a longest tightening operation time ever taken for the tightening operation.

3. A controller in accordance with claim 1, further comprising a time block setter configured to define a block of time, wherein the timer starts to count a block of time upon a start of the tightening operation and continues counting the block of time until the tightening torque reaches at the tightening completion torque.

* * * * *